United States Patent
Moriya et al.

(10) Patent No.: US 11,710,858 B2
(45) Date of Patent: *Jul. 25, 2023

(54) VEHICLE POWER SUPPLY APPARATUS

(71) Applicant: SUBARU CORPORATION, Tokyo (JP)

(72) Inventors: Fumiyuki Moriya, Tokyo (JP); Daisuke Kato, Tokyo (JP); Hirofumi Yabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 539 days.

This patent is subject to a terminal disclaimer.

(21) Appl. No.: 16/837,203

(22) Filed: Apr. 1, 2020

(65) Prior Publication Data

US 2020/0373627 A1  Nov. 26, 2020

(30) Foreign Application Priority Data

May 24, 2019  (JP) ................................. 2019-097620

(51) Int. Cl.
  *H01M 10/42*  (2006.01)
  *B60L 50/60*  (2019.01)

(52) U.S. Cl.
  CPC ........... *H01M 10/425* (2013.01); *B60L 50/66* (2019.02); *H01M 2220/20* (2013.01)

(58) Field of Classification Search
  CPC .. H01M 10/425; H01M 2220/20; B60L 50/66
  See application file for complete search history.

(56) References Cited

U.S. PATENT DOCUMENTS

| 6,327,994 | B1 * | 12/2001 | Labrador | ................ | B63B 39/06 |
|  |  |  |  |  | 114/382 |
| 9,387,763 | B2 * | 7/2016 | Yoshimi | ................... | B60L 1/00 |
| 10,110,035 | B2 * | 10/2018 | Butzmann | ............... | H02M 7/49 |

(Continued)

FOREIGN PATENT DOCUMENTS

| JP | 2015-214274 A | 12/2015 |
| JP | 2015-217837 A | 12/2015 |

(Continued)

OTHER PUBLICATIONS

Japanese Office Action, dated Apr. 18, 2023, in Japanese Application No. 2019-097620 and English Machine Translation thereof.

*Primary Examiner* — Alexander Usyatinsky
(74) *Attorney, Agent, or Firm* — McGinn I.P. Law Group, PLLC (57) ABSTRACT

A vehicle power supply apparatus includes first and second device batteries, first and second power supply lines, a current path, first and second switches, and a second diode. The current path is coupled between the first and second power supply lines through a first diode. The first diode is provided on the current path and directed to make a current flow toward the second power supply line. The first switch is interposed between the first device battery and the first power supply line. The second diode and the second switch are interposed between the second device battery and the second power supply line. The second diode is directed to make a current flow toward the second power supply line, and the second switch is coupled in parallel to the second diode.

16 Claims, 7 Drawing Sheets

(56) References Cited

U.S. PATENT DOCUMENTS

| | | | | |
|---|---|---|---|---|
| 11,161,429 B2* | 11/2021 | Moriya | ................... | B60L 58/21 |
| 2011/0001352 A1* | 1/2011 | Tamura | ................... | B60L 58/14 |
| | | | | 307/9.1 |
| 2013/0201316 A1* | 8/2013 | Binder | .................... | H04L 67/12 |
| | | | | 701/2 |
| 2016/0257270 A1* | 9/2016 | Teramoto | .............. | H01M 16/00 |
| 2018/0093581 A1 | 4/2018 | Shiraishi et al. | | |
| 2018/0291857 A1* | 10/2018 | Kinoshita | ............. | H02J 7/0029 |
| 2019/0288528 A1* | 9/2019 | Greetham | ............... | B60L 58/19 |

FOREIGN PATENT DOCUMENTS

| | | | |
|---|---|---|---|
| JP | 2015-221595 A | | 12/2015 |
| JP | 2018-060641 A | | 4/2018 |
| JP | 2018-170927 A | | 11/2018 |
| JP | 2018-198519 A | | 12/2018 |
| JP | 2018198519 | * | 12/2018 |

* cited by examiner

VEHICLE POWER SUPPLY APPARATUS

CROSS-REFERENCE TO RELATED APPLICATIONS

This application claims priority from Japanese Patent Application No. 2019-097620 filed on May 24, 2019, the entire contents of which are hereby incorporated by reference.

BACKGROUND

The technology relates to a vehicle power supply apparatus that supplies electric power to an electric device of a vehicle.

In recent years, some vehicles include a plurality of device batteries and can supply electric power from any one of the device batteries to an electric device of the vehicle. Examples of the electric device of the vehicle may include, without limitation, auxiliaries that contribute to travel of the vehicle. The device batteries are, for example, 12-volt accumulators. In engine vehicles, the device batteries are also called batteries for auxiliaries.

Japanese Unexamined Patent Application Publication (JP-A) No. 2018-198519 describes a vehicle including a first accumulator and a second accumulator. The first accumulator and the second accumulator supply electric power to an electric motor coupled to an engine. The vehicle of JP-A No. 2018-198519 is provided with a power supply apparatus including two switches. One switch can isolate the electric motor and the first accumulator from each other. The other switch can isolate the electric motor and the second accumulator from each other.

SUMMARY

An aspect of the technology provides a vehicle power supply apparatus including a first device battery, a second device battery, a first power supply line, a second power supply line, a current path, a first switch, a second diode, and a second switch. The first device battery and the second device battery are configured to supply electric power to an electric device of a vehicle. The first device battery is configured to be coupled to the first power supply line. The second device battery is configured to be coupled to the second power supply line, and the electric device is coupled to the second power supply line. The current path is coupled between the first power supply line and the second power supply line through a first diode. The first diode is provided on the current path and directed to make a current flow toward the second power supply line. The first switch is interposed between the first device battery and the first power supply line. The second diode and the second switch are interposed between the second device battery and the second power supply line. The second diode is directed to make a current flow toward the second power supply line, and the second switch is coupled in parallel to the second diode.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In a vehicle including two device batteries, even in a case with one of the two device batteries failing, an electric device such as auxiliaries is driven with electric power from the other of the two device batteries, making it possible for the vehicle to keep on traveling. This sometimes results in continuous use of the vehicle, with the failing device battery out of repair or replacement.

With the failing device battery left coupled to a power supply line, currents flow into the failing device battery from a normal device battery when a system of the vehicle is in operation or in a halt. Moreover, there is possibility of a current flow into the failing device battery from a generator or a DC/DC converter when the system of the vehicle is in operation. Accordingly, in the case with the device battery failing, it is desirable to isolate the failing device battery from the power supply line both when the system of the vehicle is in operation and when the system of the vehicle is in the halt. A further consideration is directed to a configuration in which a device battery is coupled to a power supply line through a switch such as a relay and a semiconductor switch.

In the configuration in which the device battery is coupled to the power supply line through the switch, controlling the switch makes it possible to isolate the failing device battery from the power supply line when the system of the vehicle is in operation. On the other hand, such a switch control is unavailable when the system of the vehicle is in the halt. In this case, a switch that opens when it is uncontrolled is adopted in order to isolate the failing device battery from the power supply line. But in a case with a configuration in which two device batteries are coupled to a power supply line through their respective switches that open when they are uncontrolled, the device batteries are both isolated from the power supply line when the system of the vehicle is in the halt. This inhibits the power supply line from being supplied with a power supply voltage or electric power for start-up of the system of the vehicle, rendering the system of the vehicle unable to start up.

It is desirable to provide a vehicle power supply apparatus that makes it possible to suppress charge and discharge of whichever of a first device battery and a second device battery has failed, regardless of whether a system of a vehicle is in operation or whether the system of the vehicle is in a halt. It is desirable to provide a vehicle power supply apparatus that makes it possible to start up the system of the vehicle from the halt with electric power from whichever device battery is normal.

Figure 1:
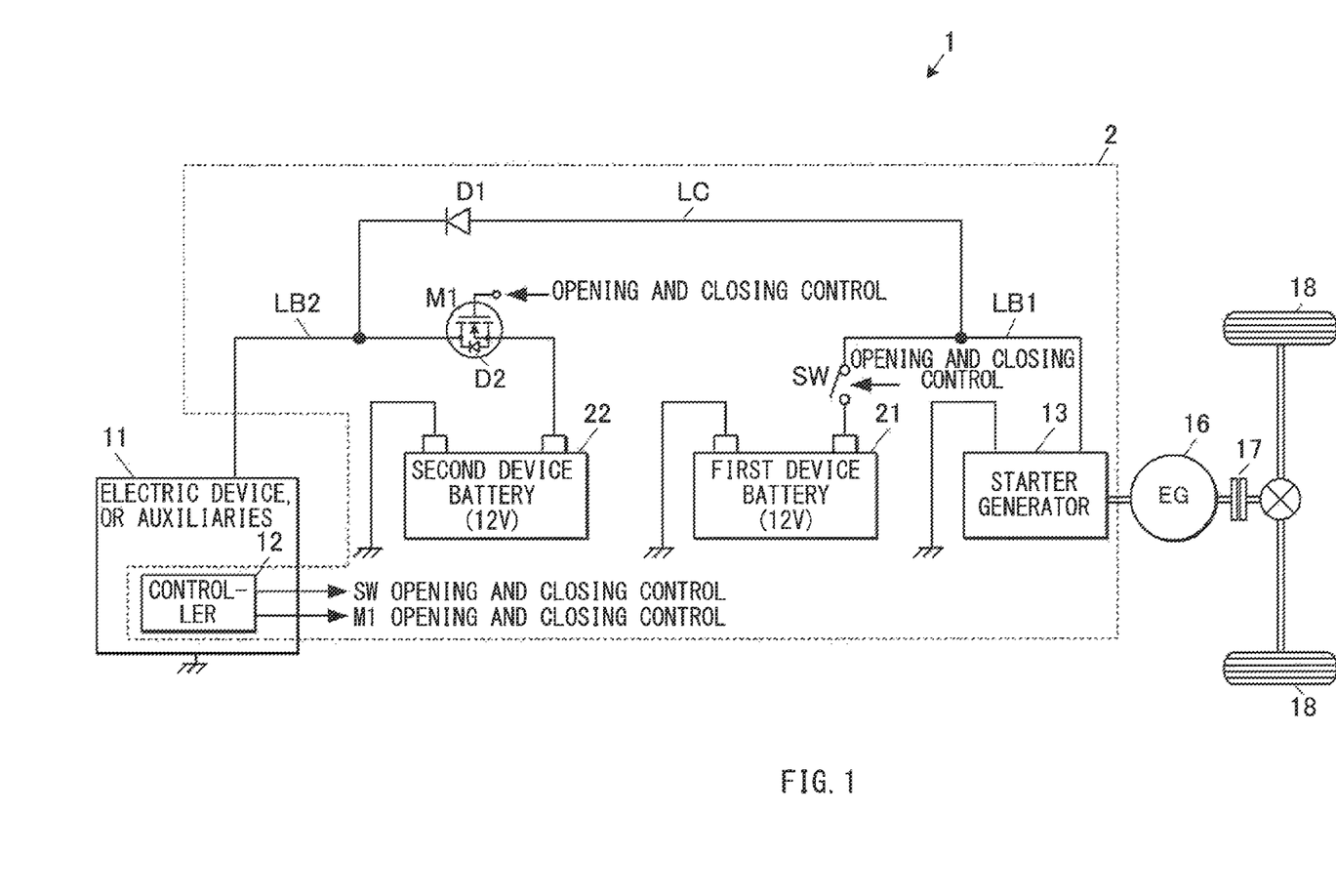
FIG. 1 is a configuration diagram of a main part of a vehicle on which a vehicle power supply apparatus according to one embodiment of the technology is mounted.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated. FIG. 1 is a configuration diagram of a main part of a vehicle on which a vehicle power supply apparatus according to one embodiment of the technology is mounted.

A vehicle 1 according to an embodiment of the technology may be an engine vehicle, and include an engine 16, drive wheels 18, a clutch 17, and a starter generator 13. The clutch 17 may intermit power transmission from the engine 16 to the drive wheels 18. The starter generator 13 may perform power generation and cause a restart of the engine 16.

The vehicle 1 may further include an electric device 11, a first device battery 21, a second device battery 22, a first power supply line LB1, a second power supply line LB2, and a current path LC. The electric device 11 may include auxiliaries. The first power supply line LB1 and the second power supply line LB2 are provided for transmission of electric power to be supplied to the electric device 11. The current path LC is coupled between the first power supply line LB1 and the second power supply line LB2.

The vehicle 1 further includes a diode D1, a switch SW, and a semiconductor switch M1. The diode D1 is provided on the current path LC. The switch SW is interposed between the first device battery 21 and the first power supply line LB1. The semiconductor switch M1 is interposed between the second device battery 22 and the second power supply line LB2. The semiconductor switch M1 may include a parasitic diode D2.

In one embodiment of the technology, the diode D1 may serve as a "first diode". In one embodiment of the technology, the switch SW may serve as a "first switch". In one embodiment of the technology, the semiconductor switch M1 may serve as a "second switch". In one embodiment of the technology, the parasitic diode D2 of the semiconductor switch M1 may serve as a "second diode". In one embodiment of the technology, the starter generator 13 may serve as a "power supply device".

A configuration including the following constituent elements may serve as a vehicle power supply apparatus 2 according to one embodiment of the technology: the starter generator 13, the first device battery 21, the second device battery 22, the first power supply line LB1, the second power supply line LB2, the current path LC including the diode D1 thereon, the switch SW, the semiconductor switch M1, and a controller 12. As mentioned above, the starter generator 13 may serve as the "power supply device" according to one embodiment of the technology.

The electric device 11 may include an electrically-powered device that contributes to travel of the vehicle 1. Non-limiting examples of the electric device 11 may include auxiliaries that provide assistance with driving of the engine 16. The electric device 11 may include an undepicted regulator circuit and the controller 12. The regulator circuit may step down a power supply voltage of the second power supply line LB2 to generate a power supply voltage for a control system. The power supply voltage for the control system may be, for example, 5 V. The controller 12 may operate with the voltage of the regulator circuit.

The controller 12 may perform a control of the vehicle 1. The control of the vehicle 1 may include a travel control and a system control of the vehicle 1. In one specific but non-limiting example, the controller 12 may perform an opening and closing control of the switch SW and the semiconductor switch M1, a control of engagement and disengagement of the clutch 17, an operation control of the starter generator 13, and an operation control of the electric device 11 inclusive of the auxiliaries. The controller 12 may include a single electronic control unit (ECU), or alternatively, the controller 12 may include a plurality of ECUs that cooperate in association by communication.

The first device battery 21 may include, for example, a lithium ion secondary battery, and output, for example, a 12-volt power supply voltage for devices. The second device battery 22 may include, for example, a lead accumulator, and output a power supply voltage that is substantially the same as that of the first device battery 21. It is to be noted that there is no particular limitation on kinds or categories of the first device battery 21 and the second device battery 22. The first device battery 21 may be of a different kind from what is described above, e.g., a lead accumulator or a nickel hydrogen secondary battery. The second device battery 22 may be of a different kind from what is described above, e.g., a lithium ion secondary battery or a nickel hydrogen secondary battery. The first device battery 21 and the second device battery 22 may be accumulators of the same kind, or alternatively, the first device battery 21 and the second device battery 22 may be accumulators of different kinds.

The starter generator 13 may utilize part of motive power of the engine 16 in the driving of the engine 16, to perform power generation. The starter generator 13 may supply electric power thus generated, to the first power supply line LB1. The starter generator 13 may output, to the first power supply line LB1, a slightly higher voltage than an output voltage of the first device battery 21 and an output voltage of the second device battery 22. Thus, the starter generator 13 is capable of supplying a charge current, or charging electric power, to the first device battery 21 and the second device battery 22, and to supply a drive current to the electric device 11. The starter generator 13 may also operate as an electric motor. For example, in a case where the engine 16 is stopped and heated, the starter generator 13 is capable of giving motive power to the engine 16, to cause a restart of the engine 16. The starter generator 13 may be divided into a generator and a starter.

The first power supply line LB1 and the second power supply line LB2 may be power lines from which, for example, the 12-volt power supply voltage for the devices is outputted. The first power supply line LB1 and the second power supply line LB2 are coupled together through the current path LC. To the first power supply line LB1, the first device battery 21 is couplable through the switch SW. Moreover, the starter generator 13 may be coupled to the first power supply line LB1. To the second power supply line LB2, the second device battery 22 is couplable through the semiconductor switch M1. Moreover, the electric device 11 is coupled to the second power supply line LB2.

The current path LC may include one end coupled to the first power supply line LB1, and another end coupled to the second power supply line LB2. Thus, the current path LC is capable of allowing a current to flow between the first power supply line LB1 and the second power supply line LB2. The diode D1 is provided on the current path LC. The diode D1 is directed to make a current flow toward the second power supply line LB2. That is, a cathode of the diode D1 is coupled to the second power supply line LB2, and an anode of the diode D1 is coupled to the first power supply line LB1.

The switch SW may include a switch that closes when it is uncontrolled, i.e., a normally close switch. The switch SW may include, for example, a relay, but the switch SW may include a semiconductor switch. A relay that closes when it is uncontrolled corresponds to a configuration that closes unenergized. A semiconductor switch that closes when it is uncontrolled corresponds to a configuration that closes when an output to a control terminal is at a ground potential.

The semiconductor switch M1 may include a switch that opens when it is uncontrolled, i.e., a normally open switch. The semiconductor switch M1 may include, for example, a field effect transistor. The semiconductor switch M1 may include the parasitic diode D2. The semiconductor switch M1 may include a source terminal coupled to a positive electrode of the second device battery 22, and a drain terminal coupled to the second power supply line LB2. The parasitic diode D2 is directed to make a current flow from the second device battery 22 toward the second power supply line LB2. It is to be noted that the semiconductor switch M1 may be replaced with another normally open switch, e.g., a relay, and a diode coupled in parallel to the relevant normally open switch, i.e., a diode directed the same as the parasitic diode D2.

<Description of Operation>

Figure 2:
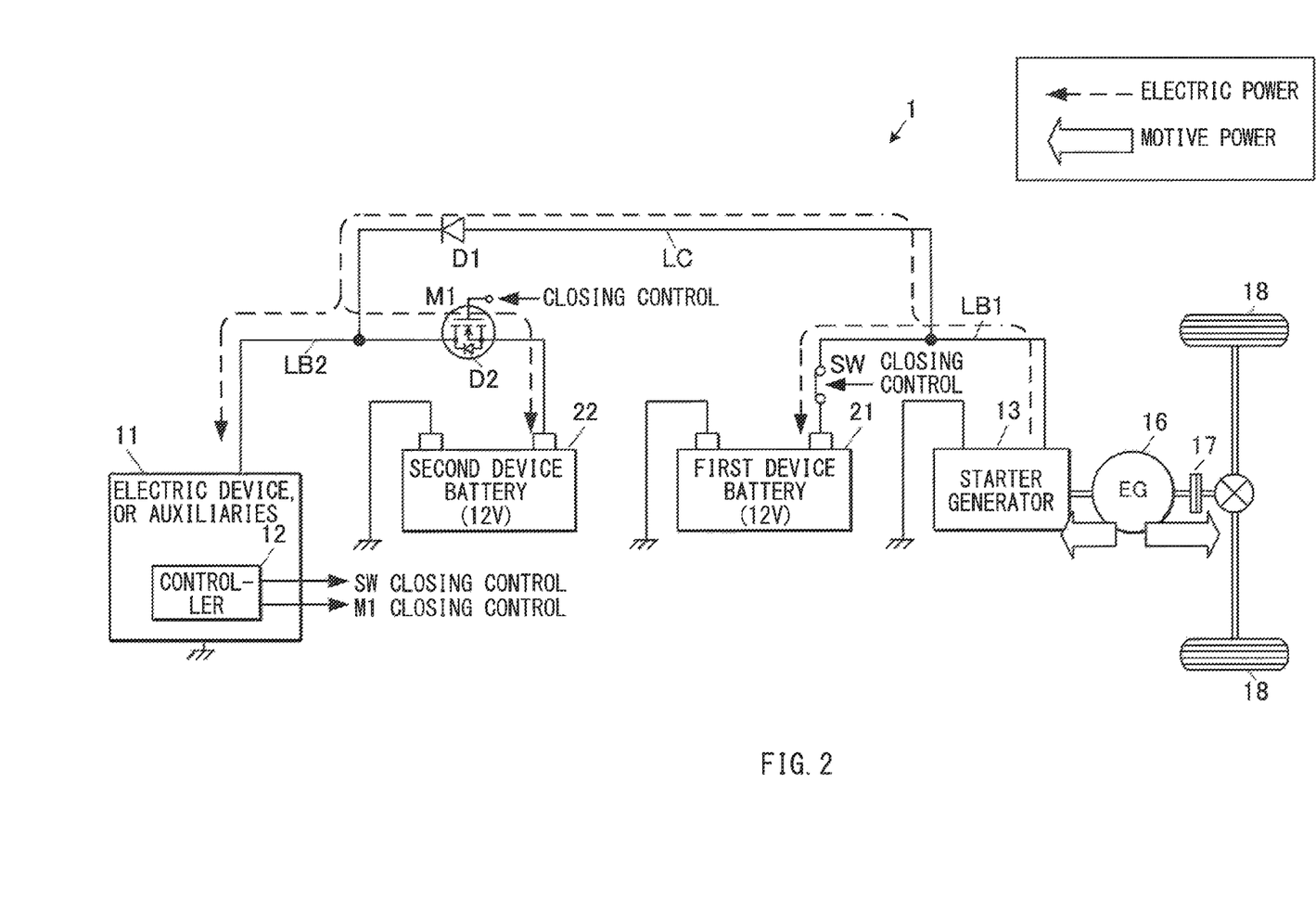
FIG. 2 is a configuration diagram of a current flow on vehicle travel.

FIG. 2 is a configuration diagram of a current flow on vehicle travel. On the travel of the vehicle 1, the engine 16 operates, and its motive power is transmitted to the driving wheels 18. Meanwhile, part of the motive power of the engine 16 is transmitted to the starter generator 13, causing the starter generator 13 to perform the power generation. In a case where the first device battery 21 and the second device battery 22 are normal, the switch SW and the semiconductor switch M1 are kept in a closed state, by the control by the controller 12. Accordingly, as illustrated in FIG. 2, electric power generated by the starter generator 13 is transmitted to the first device battery 21, the second device battery 22, and the electric device 11 through the first power supply line LB1, the current path LC, and the second power supply line LB2.

Figure 3:
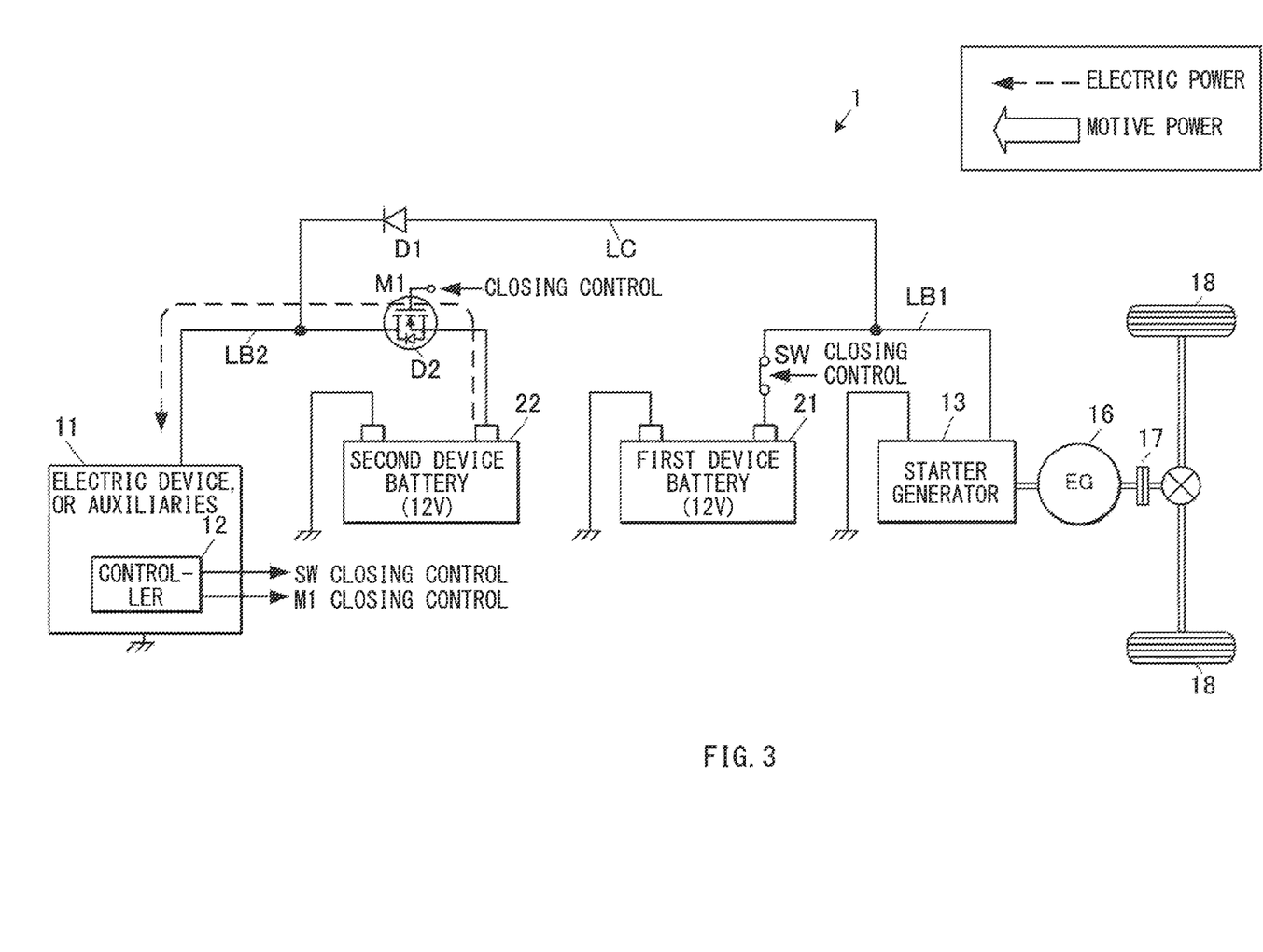
FIG. 3 is a configuration diagram of a current flow during a vehicle stop.

FIG. 3 is a configuration diagram of a current flow during a vehicle stop. When the engine 16 stops while the system of the vehicle 1 is in operation, the power generation by the starter generator 13 stops. In the case where the first device battery 21 and the second device battery 22 are normal, the switch SW and the semiconductor switch M1 are kept in the closed state, which makes both the first device battery 21 and the second device battery 22 available for electric power supply to the electric device 11. On the current path LC, however, there occurs a voltage drop in the diode D1. Accordingly, in a case where an output voltage of the second device battery 22 is normal, electric power is supplied to the electric device 11 from the second device battery 22 through the second power supply line LB2. In a case where the output voltage of the second device battery 22 lowers, electric power is supplied to the electric device 11 from the first device battery 21 through the first power supply line LB1, the current path LC, and the second power supply line LB2. Electric power thus supplied allows the electric device 11 including the controller 12 to operate, to maintain the operation of the system of the vehicle 1.

Figure 4:
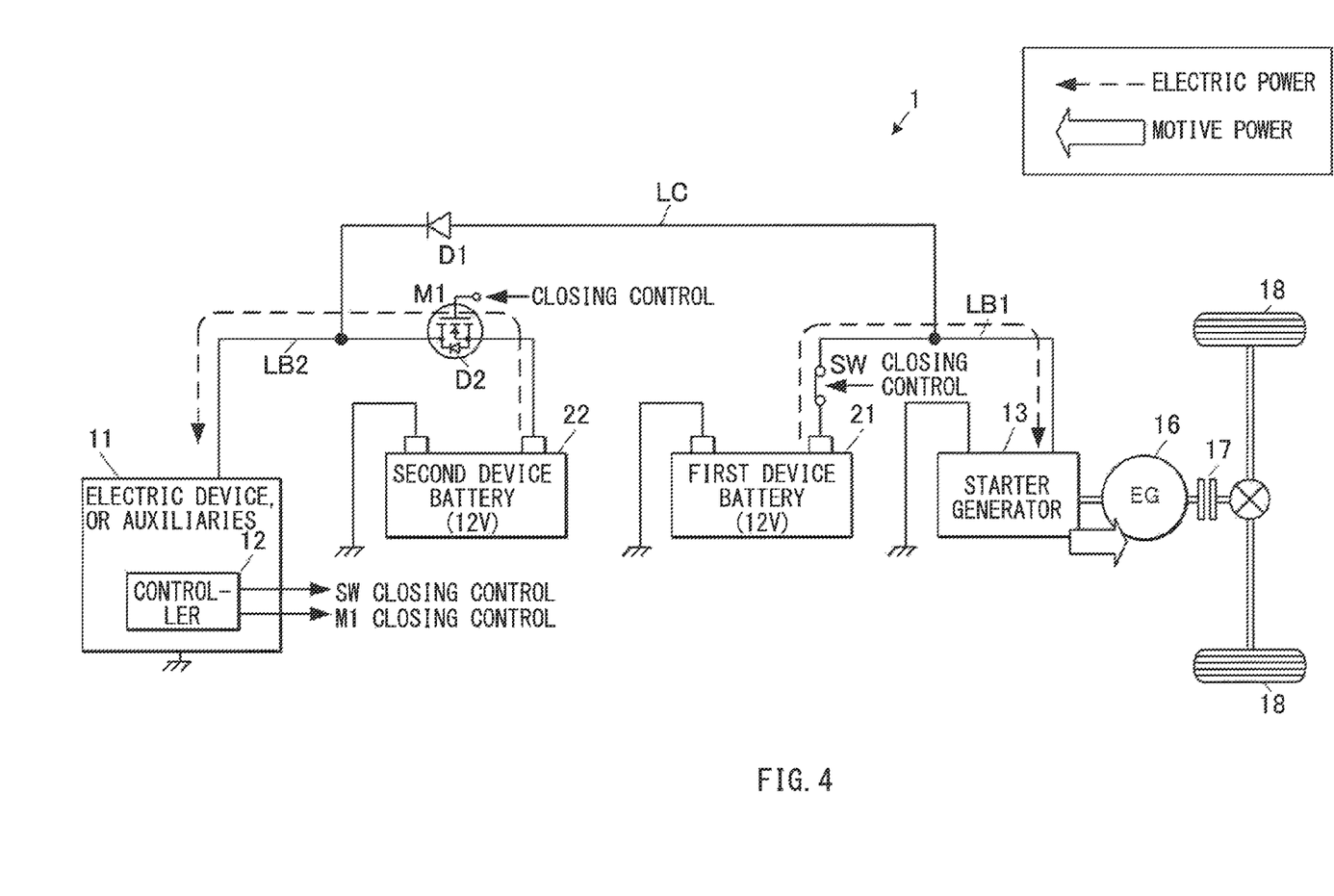
FIG. 4 is a configuration diagram of a current flow at an engine restart.

FIG. 4 is a configuration diagram of a current flow at an engine restart. Here is assumed a case where the engine 16 temporarily stops because of the stop of the vehicle 1, and thereafter, the engine 16 is restarted to allow the vehicle 1 to travel again. It is, however, assumed that the first device battery 21 and the second device battery 22 are normal. In this case as well, the controller 12 controls the switch SW and the semiconductor switch M1 to keep them in the closed state. On the basis of an operation for the restart, the controller 12 disengages the clutch 17 to allow the starter generator 13 to operate as an electric motor for the restart of the engine 16. At this occasion, the starter generator 13 operates with electric power from the first device battery 21, and the electric device 11 operates with electric power from the second device battery 22.

Because the starter generator 13 has relatively great power consumption, there occurs a great voltage drop in the first power supply line LB1. But the diode D1 on the current path LC keeps the voltage drop in the first power supply line LB1 from extending to the second power supply line LB2. Hence, it is possible to reduce possibility that the power supply voltage supplied to the electric device 11 becomes lower than a lower limit voltage that maintains the operation of the electric device 11.

<Case with Second Device Battery Failing>

Figure 5:
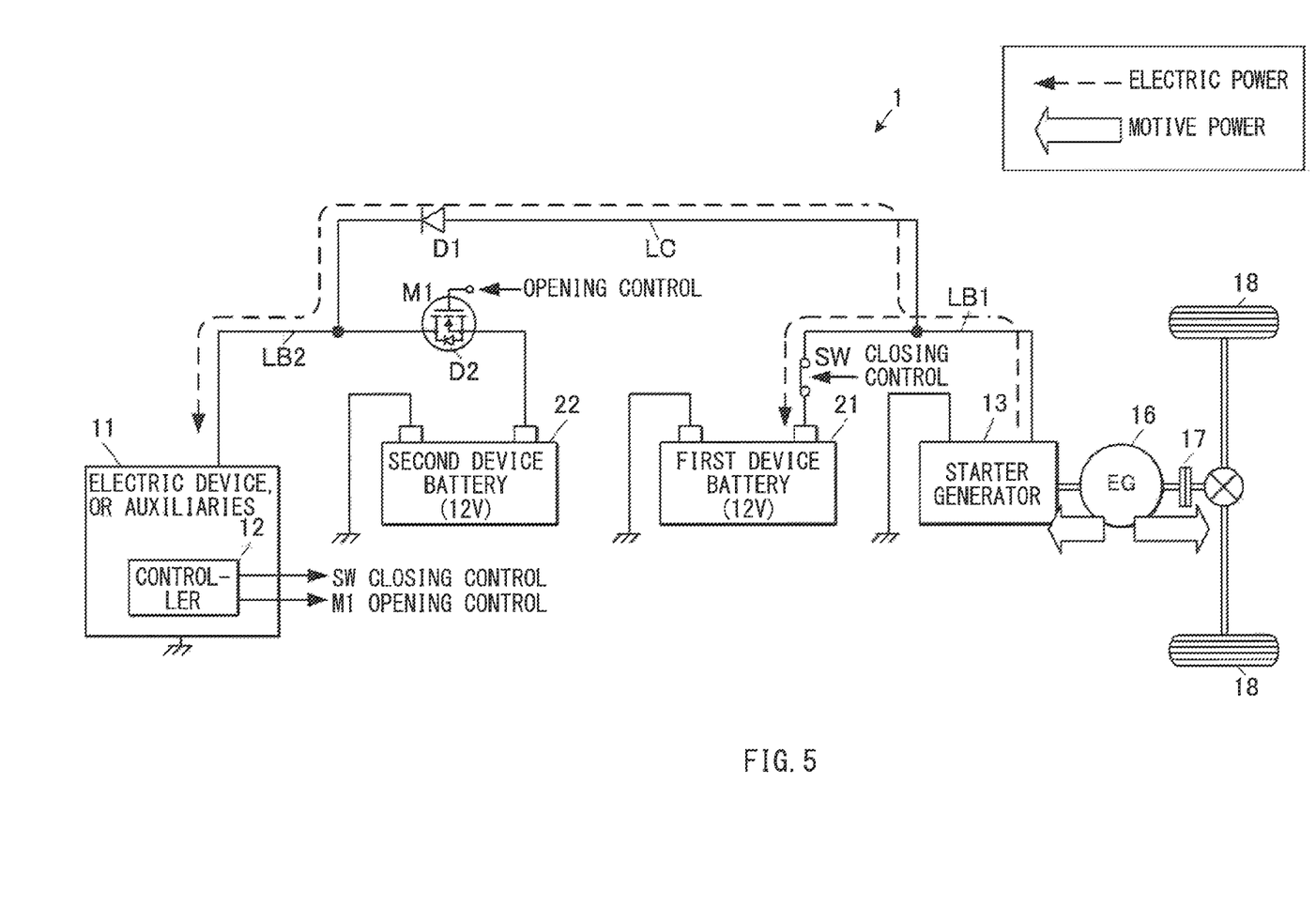
FIG. 5 is a configuration diagram of a state with a second device battery failing.

FIG. 5 is a configuration diagram of a state with the second device battery failing. In a case where the second device battery 22 has failed, while the system of the vehicle 1 is in operation, the controller 12 continuously closes the switch SW and opens the semiconductor switch M1. Such a control state of the switch SW and the semiconductor switch M1 is referred to as a "control with the second device battery 22 failing".

As illustrated in FIG. 5, in the control with the second device battery 22 failing, the starter generator 13 performs the power generation on the travel of the vehicle 1, and electric power thus generated is supplied to the first device battery 21 through the first power supply line LB1, to charge the first device battery 21. Furthermore, electric power generated is supplied to the electric device 11 through the current path LC and the second power supply line LB2, to allow the electric device 11 to operate. Because the semiconductor switch M1 is open, electric power generated is not transmitted to the second device battery 22. This prevents a current from flowing into the failing second device battery 22. Furthermore, the output voltage of the second device battery 22 lowers because of the failure, causing the voltage of the second power supply line LB2 to become higher than the output voltage of the failing second device battery 22. This prevents the failing second device battery 22 from discharging toward the second power supply line LB2 regardless of presence of the parasitic diode D2 in the semiconductor switch M1.

In the control with the second device battery 22 failing, during the stop of the engine 16, electric power is supplied to the electric device 11 from the first device battery 21 through the current path LC. This allows the electric device 11 including the controller 12 to operate, maintaining the operation of the system of the vehicle 1. At this occasion, the semiconductor switch M1 is open, which prevents a current from flowing into the second device battery 22. Furthermore, the output voltage of the second device battery 22 lowers because of the failure. This prevents the failing second device battery 22 from discharging regardless of the presence of the parasitic diode D2 in the semiconductor switch M1 includes the parasitic diode D2.

Description now moves on to a case where the system of the vehicle 1 is in operation, with the first device battery 21 and the second device battery 22 having been normal, and with both the switch SW and the semiconductor switch M1 kept in the closed state, and then, the second device battery 22 fails. In this case, with the switch SW and the semiconductor switch M1 in the closed state, a current of the second power supply line LB2 is drawn into the failing second device battery 22. This may cause the power supply voltage of the second power supply line LB2 to lower even if the first device battery 21 is normal. In a case where the power supply voltage of the second power supply line LB2 becomes lower than a lower limit voltage that makes it possible to maintain the control of the semiconductor switch M1, the semiconductor switch M1 automatically switches to an open state. This stops the current from being drawn into the failing second device battery 22, allowing an output of the normal first device battery 21 to restore the power supply voltage of the second power supply line LB2. Hence, it is possible to allow the electric device 11 including the controller 12 to operate, maintaining the operation of the system of the vehicle 1.

<Case with First Device Battery Failing>

Figure 6:
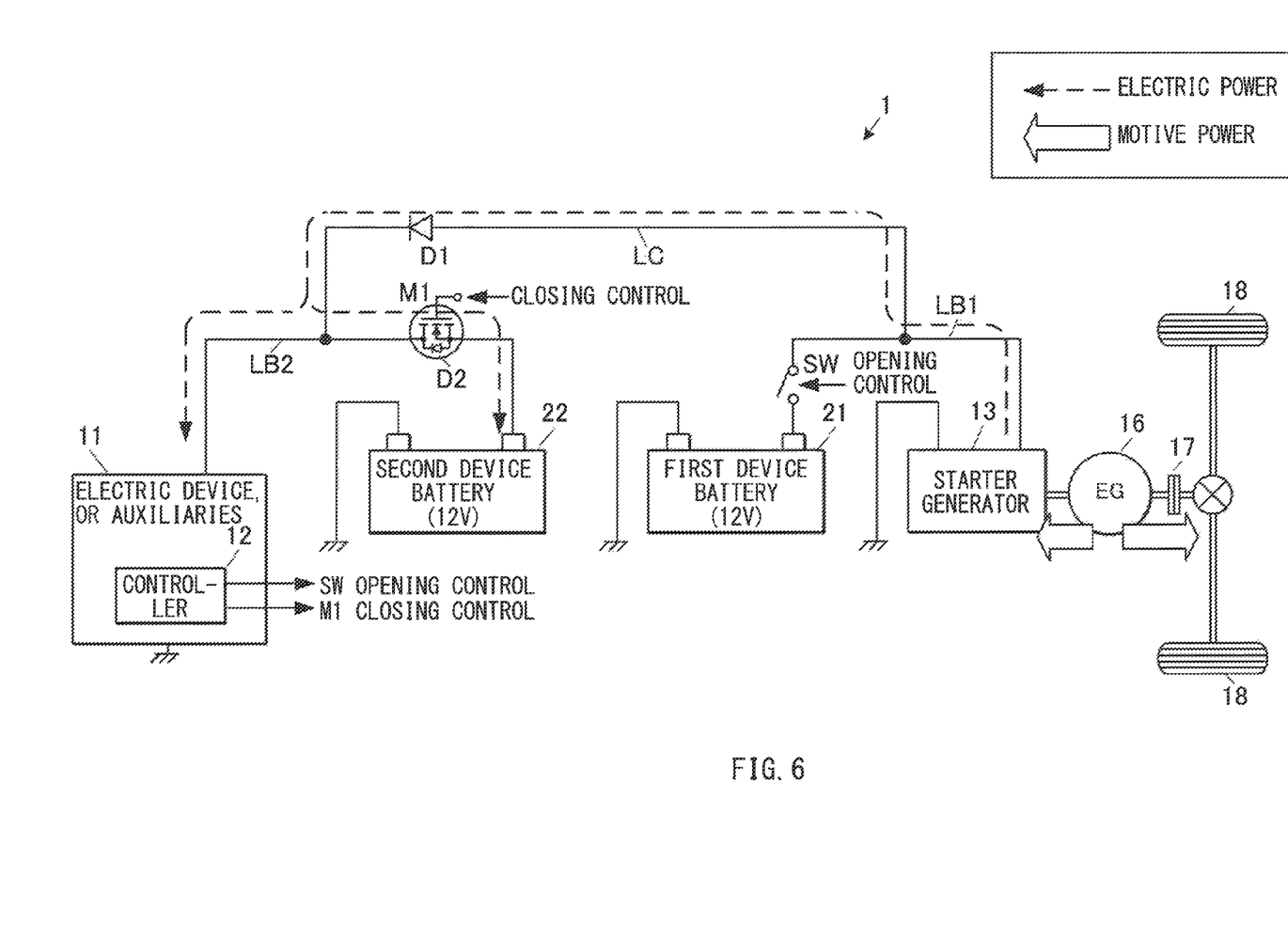
FIG. 6 is a configuration diagram of a state with a first device battery failing.

FIG. 6 is a configuration diagram of a state with the first device battery failing. In a case where the first device battery 21 has failed, while the system of the vehicle 1 is in operation, the controller 12 maintains a control of opening the switch SW and closing the semiconductor switch M1. Such a control state of the switch SW and the semiconductor switch M1 is referred to as a "control with the first device battery 21 failing".

As illustrated in FIG. 6, in the control with the first device battery 21 failing, the starter generator 13 performs the power generation on the travel of the vehicle 1, and electric power thus generated is supplied to the second device battery 22 and the electric device 11 through the first power supply line LB1, the current path LC, and the second power supply line LB2. This causes the second device battery 22 to be charged with electric power generated, and causes the electric device 11 to operate. Because the failing first device battery 21 is isolated from the first power supply line LB1, the failing first device battery 21 neither discharges nor has any current flowing therein.

In the control with the first device battery 21 failing, during the stop of the engine 16, electric power is supplied to the electric device 11 from the second device battery 22 through the second power supply line LB2. This allows the electric device 11 including the controller 12 to operate, maintaining the operation of the system of the vehicle 1. Because the failing first device battery 21 is isolated from the first power supply line LB1, the failing first device battery 21 neither discharges nor has any current flowing therein.

<In System Halt>

Figure 7:
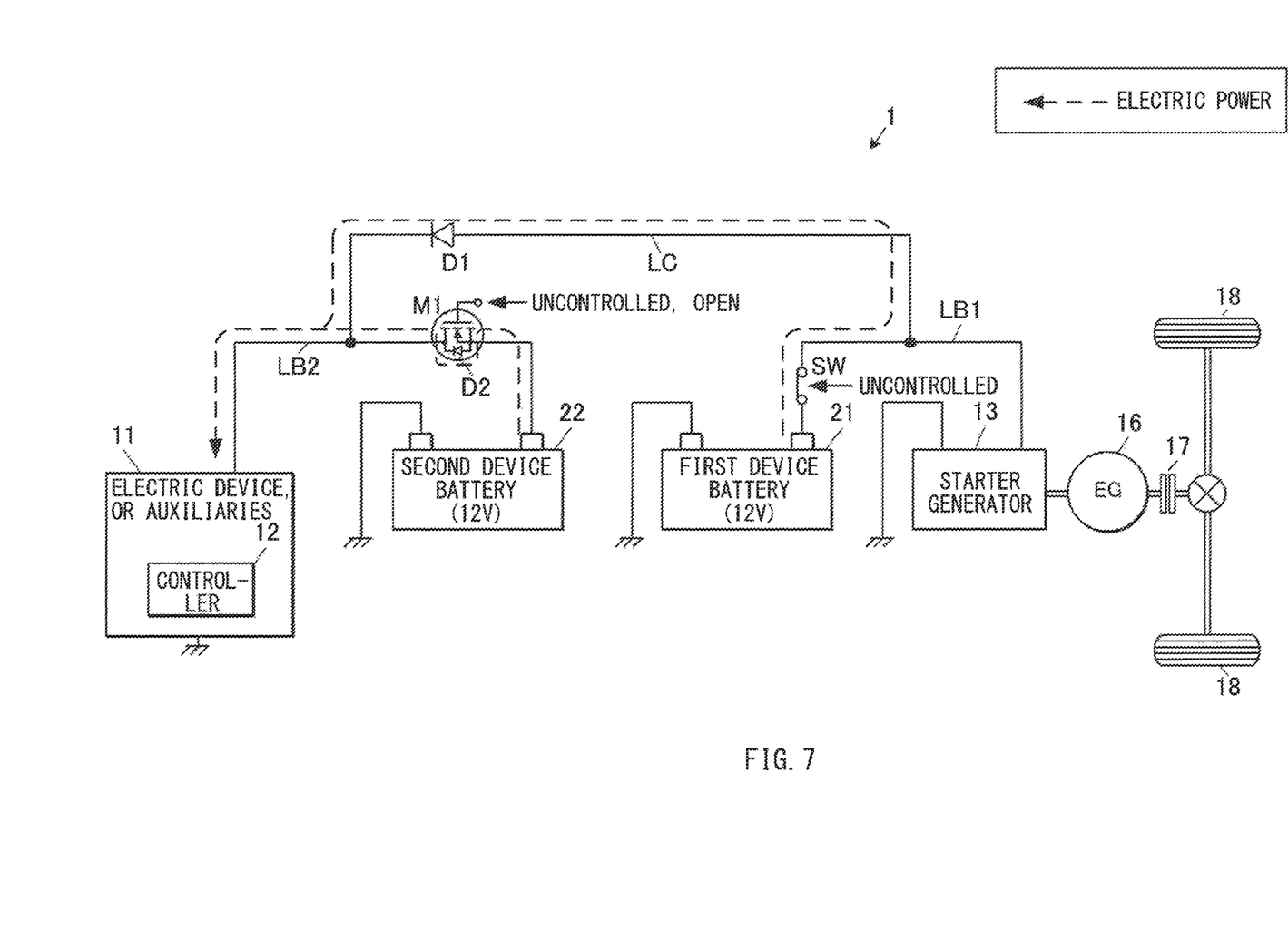
FIG. 7 is a configuration diagram of a state in a system halt.

FIG. 7 is a configuration diagram of a state in a system halt. In the system halt, the controller 12 keep from controlling the switch SW and the semiconductor switch M1, or alternatively, the switch SW and the semiconductor switch M1 are not energized for the control. Accordingly, the switch SW, being normally closed, is brought to the closed state, and the semiconductor switch M1, being normally open, is brought to the open state.

In the case where both the first device battery 21 and the second device battery 22 are normal, in the system halt, as illustrated in FIG. 7, the electric device 11 is supplied with the power supply voltage from whichever has the higher output voltage. In other words, the second device battery 22 is available for outputting the power supply voltage to the electric device 11 through the parasitic diode D2 of the semiconductor switch M1 and the second power supply line LB2. The first device battery 21 is available for outputting the power supply voltage to the electric device 11 through the first power supply line LB1, the current path LC, and the second power supply line LB2. The power supply voltage allows the controller 12 to perform standby operation. This makes it possible for the controller 12 to operate to start up the system of the vehicle 1, upon an operation by an occupant for the start-up of the system of the vehicle 1.

In the system halt, in a case where the first device battery 21 has failed and the second device battery 22 is normal, the output voltage of the failing first device battery 21 lowers. This causes a cut-off action of the diode D1, preventing a current from flowing through the current path LC. Moreover, in the system halt, the starter generator 13 does not operate. Accordingly, the failing first device battery 21 neither discharges nor has any current flowing therein.

Meanwhile, even if the first device battery 21 has failed, the power supply voltage is supplied to the electric device 11 from the second device battery 22 through the parasitic diode D2 of the semiconductor switch M1. The power supply voltage allows the controller 12 to perform the standby operation. This makes it possible for the controller 12 to operate to start up the system of the vehicle 1, upon the operation by the occupant for the start-up of the system of the vehicle 1.

In the system halt, in a case where the first device battery 21 is normal and the second device battery 22 has failed, the output voltage of the failing second device battery 22 lowers. Because the semiconductor switch M1 is open in the system halt, the failing second device battery 22 neither discharges nor has any current flowing therein, regardless of the presence of the parasitic diode D2 of the semiconductor switch M1.

Meanwhile, even if the second device battery 22 has failed, the power supply voltage is supplied to the electric device 11 from the first device battery 21 through the current path LC. The power supply voltage allows the controller 12 to perform the standby operation. This makes it possible for the controller 12 to operate to start up the system of the vehicle 1, upon the operation by the occupant for the start-up of the system of the vehicle 1.

<Failure Diagnosis>

In the vehicle 1 including the vehicle power supply apparatus 2 according to this embodiment mounted thereon, a failure diagnosis of the first device battery 21 and the second device battery 22 may be made, for example, as follows.

In the failure diagnosis of the second device battery 22, the controller 12 may switch the semiconductor switch M1 to the open state, to measure the output voltage of the second device battery 22. In a case where a measured value is equal to or smaller than a predetermined threshold voltage, the controller 12 may determine that the second device battery 22 has failed. The semiconductor switch M1 may be switchable to the open state, while the system of the vehicle 1 is in operation, regardless of whether the vehicle 1 is stopped or whether the vehicle 1 is travelling. Hence, it is possible to make the failure diagnosis of the second device battery 22 as frequently as desired.

In the failure diagnosis of the first device battery 21, the controller 12 may measure the output voltage of the first device battery 21 with the switch SW switched to the open state. In a case where a measured value is equal to or smaller than a predetermined threshold value, the controller 12 may determine that the first device battery 21 has failed. In another alternative, the controller 12 may be configured to measure a current of the first device battery 21, to determine that the first device battery 21 has failed, in a case where a measured value of the charge current of the first device battery 21 is abnormal. The failure diagnosis based on the current measurement is able to be executed, with the switch SW kept closed. Hence, it is possible for the controller 12 to make the failure diagnosis highly frequently.

As described, according to the vehicle power supply apparatus 2 of this embodiment, the first device battery 21 is coupled to the first power supply line LB1 through the switch SW. The second device battery 22 is coupled to the second power supply line LB2 through the semiconductor switch M1 including the parasitic diode D2. Furthermore, the first power supply line LB1 and the second power supply line LB2 are coupled through the current path LC on which the diode D1 is provided. The electric device 11 is coupled to the second power supply line LB2. With this configuration, closing the switch SW and opening the semiconductor switch M1 makes it possible to supply electric power to the electric device 11 from the first device battery 21 or the second device battery 22, while preventing the current flow into the second device battery 22 from the first device battery 21 and preventing the current flow into the first device battery 21 from the second device battery 22. Accordingly, in the system halt of the vehicle 1, switching the switch SW and the semiconductor switch M1 as described above makes it possible to isolate whichever of the first device battery 21 and the second device battery 22 has failed, and to start up the system of the vehicle 1 with whichever device battery is normal.

Moreover, according to the vehicle power supply apparatus 2 of this embodiment, the starter generator 13 may be coupled to the first power supply line LB1. Accordingly, when the starter generator 13 performs the power generation while the system of the vehicle 1 is in operation, it is possible to transmit electric power thus generated to the first device battery 21, the second device battery 22, and the electric device 11, and to use electric power generated for the charging of the first device battery 21 and the second device battery 22 and for the operation of the electric device 11. Moreover, in the case where the first device battery 21 or the second device battery 22 has failed, switching the switch SW or the semiconductor switch M1 makes it possible to isolate solely whichever device battery has failed, and to use electric power generated for the charging of whichever device battery is normal and for the operation of the electric device 11.

Furthermore, according to the vehicle power supply apparatus 2 of this embodiment, the semiconductor switch M1 including the parasitic diode D2 may be adopted as the switch interposed between the second device battery 22 and the second power supply line LB2. With this configuration, it is possible to reduce volume of a circuit device, as compared to a configuration in which a diode and a switch such as a relay are coupled in parallel. This leads to a smaller footprint of a harness in the vehicle 1, and simplification of the harness.

In addition, according to the vehicle power supply apparatus 2 of this embodiment, the switch SW is normally closed, and the semiconductor switch M1 is normally open. Accordingly, in the system halt of the vehicle 1, the control of the switch SW and the semiconductor switch M1 is automatically terminated, making it possible to close the switch SW and to open the semiconductor switch M1. Hence, a transition of the vehicle 1 to the system halt allows for an automatic transition to the system halt that makes it possible to cope with whichever of the first device battery 21 and the second device battery 22 has failed.

Moreover, according to the vehicle power supply apparatus 2 of this embodiment, the controller 12 may control the switch SW and the semiconductor switch M1. The controller 12 may be configured to operate with electric power transmitted to the second power supply line LB2. With this configuration, it is possible to allow the controller 12 to use electric power supplied by a similar route to those for other ECUs. It is, therefore, unnecessary to provide a route for electric power transmission dedicated to the controller 12. In such a configuration, in the system halt of the vehicle 1, interruption of the power supply voltage of the second power supply line LB2 may render it unable to start up the vehicle 1. However, with the forgoing configuration of the vehicle power supply apparatus 2, the second power supply line LB2 is supplied with electric power from the first device battery 21 or the second device battery 22. It is, therefore, possible to suppress the vehicle 1 from being unable to start up, insofar as either the first device battery 21 or the second device battery 22 is normal.

Although some preferred embodiments of the technology are described above by way of example with reference to the accompanying drawings, the technology is by no means limited to the embodiments described above. For example, in the forgoing example embodiments, description is given of the case where the vehicle 1 is an engine vehicle. However, the vehicle 1 may be, for example, an electric vehicle (EV) or a hybrid electric vehicle (HEV). In the case where the vehicle 1 is, for example, an EV or an HEV, not only the generator but also a DC/DC converter may serve as the power supply device configured to supply electric power to the first power supply line LB1. The DC/DC converter is configured to step down a voltage from a main battery of a high voltage and to output the stepped-down voltage. The main battery may accumulate electric power for traveling.

Moreover, in the forgoing example embodiments, the first diode according to one embodiment of the technology is exemplified by the diode D1, i.e., a device dedicated to rectification. Instead, for example, a parasitic diode included in a normally open semiconductor switch may serve as the first diode according to one embodiment of the technology. With this configuration, in a case where an electric device such as auxiliaries coupled to the second power supply line is driven with electric power of the first device battery, or in a case where the second device battery coupled to the second power supply line is charged with electric power generated by the power supply device, a control of turning on the semiconductor switch makes it possible to reduce power loss generated in the first diode. This leads to improved fuel efficiency of the vehicle.

In addition, the details described in the forgoing example embodiments may be appropriately changed insofar as the changes fall within a range not departing from the scope of the technology.

The controller 12 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 12 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus, comprising:
    a first device battery and a second device battery configured to supply electric power to an electric device of a vehicle:
    a first power supply line to which the first device battery is coupled;
    a second power supply line to which the second device battery is coupled and to which the electric device is coupled;
    a current path coupled between the first power supply line and the second power supply line through a first diode, the first diode being provided on the current path and directed to make a current flow toward the second power supply line;
    a first switch interposed between the first device battery and the first power supply line; and
    a second diode and a second switch interposed between the second device battery and the second power supply line, the second diode being directed to make a current flow toward the second power supply line, and the second switch being coupled in parallel to the second diode.

2. The vehicle power supply apparatus according to claim 1, further comprising a power supply device supplying charging electric power to the first device battery and the second device battery, wherein
    the power supply device is coupled to the first power supply line.

3. The vehicle power supply apparatus according to claim 1, wherein
    the second switch comprises a semiconductor switch, and the second diode comprises a parasitic diode of the semiconductor switch.

4. The vehicle power supply apparatus according to claim 2, wherein
    the second switch comprises a semiconductor switch, and the second diode comprises a parasitic diode of the semiconductor switch.

5. The vehicle power supply apparatus according to claim 1, wherein
    the first switch comprises a switch that closes when uncontrolled, and
    the second switch comprises a switch that opens when uncontrolled.

6. The vehicle power supply apparatus according to claim 2, wherein
    the first switch comprises a switch that closes when uncontrolled, and
    the second switch comprises a switch that opens when uncontrolled.

7. The vehicle power supply apparatus according to claim 3, wherein
    the first switch comprises a switch that closes when uncontrolled, and
    the second switch comprises a switch that opens when uncontrolled.

8. The vehicle power supply apparatus according to claim 4, wherein
    the first switch comprises a switch that closes when uncontrolled, and
    the second switch comprises a switch that opens when uncontrolled.

9. The vehicle power supply apparatus according to claim 1, further comprising a controller that controls the first switch and the second switch, wherein
    the controller operates with electric power transmitted to the second power supply line.

10. The vehicle power supply apparatus according to claim 2, further comprising a controller that controls the first switch and the second switch, wherein
    the controller operates with electric power transmitted to the second power supply line.

11. The vehicle power supply apparatus according to claim 3, further comprising a controller that controls the first switch and the second switch, wherein
    the controller operates with electric power transmitted to the second power supply line.

12. The vehicle power supply apparatus according to claim 4, further comprising a controller that controls the first switch and the second switch, wherein
    the controller operates with electric power transmitted to the second power supply line.

13. The vehicle power supply apparatus according to claim 5, further comprising a controller that controls the first switch and the second switch, wherein
    the controller operates with electric power transmitted to the second power supply line.

14. The vehicle power supply apparatus according to claim 6, further comprising a controller that controls the first switch and the second switch, wherein
    the controller operates with electric power transmitted to the second power supply line.

15. The vehicle power supply apparatus according to claim 7, further comprising a controller that controls the first switch and the second switch, wherein
    the controller operates with electric power transmitted to the second power supply line.

16. The vehicle power supply apparatus according to claim 8, further comprising a controller that controls the first switch and the second switch, wherein
    the controller operates with electric power transmitted to the second power supply line.

* * * * *